United States Patent [19]
Kodama

[11] Patent Number: 6,144,126
[45] Date of Patent: Nov. 7, 2000

[54] MAGNETIC DISC DRIVING APPARATUS

[75] Inventor: Mitsuo Kodama, Fujieda, Japan

[73] Assignee: Victor Company of Japan, Ltd., Yokohama, Japan

[21] Appl. No.: 09/406,485

[22] Filed: Sep. 27, 1999

[30] Foreign Application Priority Data

Sep. 28, 1998 [JP] Japan ................................. 10-272876

[51] Int. Cl.$^7$ ................................................. H02K 11/00
[52] U.S. Cl. .................... 310/68 B; 310/268; 310/DIG. 3
[58] Field of Search ........................ 310/68 B, 268, 310/DIG. 3, 68 R, 156

[56] References Cited

U.S. PATENT DOCUMENTS

| | | | |
|---|---|---|---|
| 4,508,998 | 4/1985 | Hahn | 318/138 |
| 4,841,393 | 6/1989 | MacLeod et al. | 360/98.07 |
| 4,922,513 | 5/1990 | Joichi | 318/254 |
| 5,124,604 | 6/1992 | Swartz | 310/68 B |
| 5,124,863 | 6/1992 | Koizumi et al. | 360/99.08 |
| 5,498,919 | 3/1996 | Bahn | 310/268 |

FOREIGN PATENT DOCUMENTS

| | | |
|---|---|---|
| 4-033552 | 2/1992 | Japan . |
| 8-047232 | 2/1996 | Japan . |

*Primary Examiner*—Nestor Ramirez
*Assistant Examiner*—Joseph Waks
*Attorney, Agent, or Firm*—Anderson, Kill & Olick P.C.

[57] ABSTRACT

The driving ring magnet 2 of 4 n magnetic poles is allocated on the rotor 1. 3 m flat coils 5 are allocated on the stator 3 with surrounding the FG (Frequency Generator) pattern 4. Each flat coil 5 is allocated in the distance of $(5/3)\pi$ of the electrical angle with being adjacent to each other. The magnetic sensor 6 is allocated in the area 20 of the maximum spacing area between the flat coils 5.

7 Claims, 7 Drawing Sheets

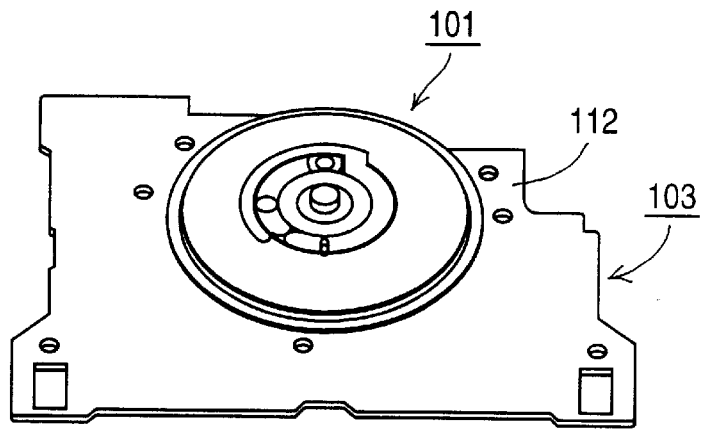
*Fig. 3* PRIOR ART
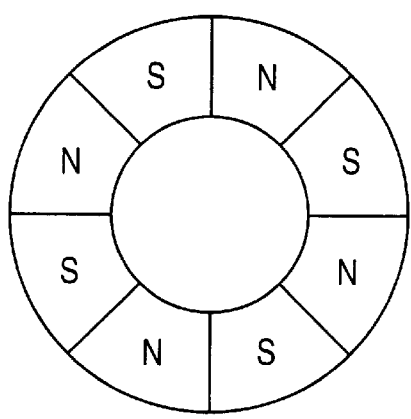
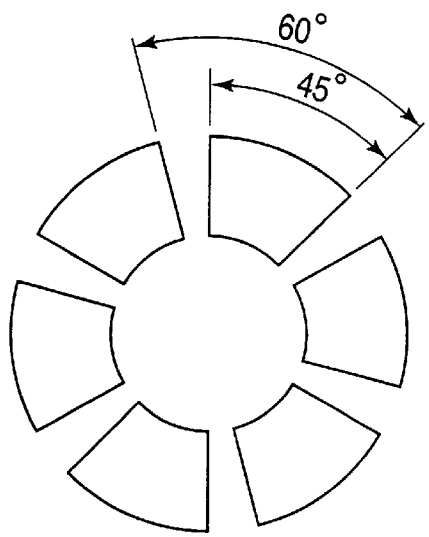
*Fig. 4(a)* PRIOR ART     *Fig. 4(b)* PRIOR ART

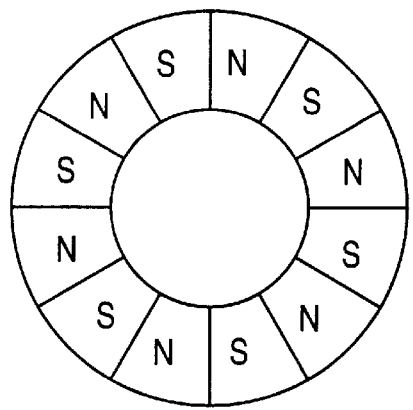
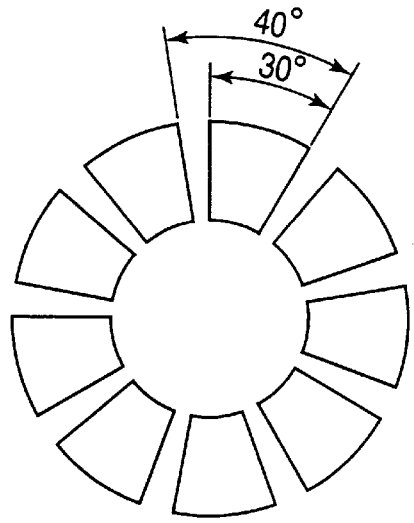
*Fig. 5(a)* PRIOR ART    *Fig. 5(b)* PRIOR ART
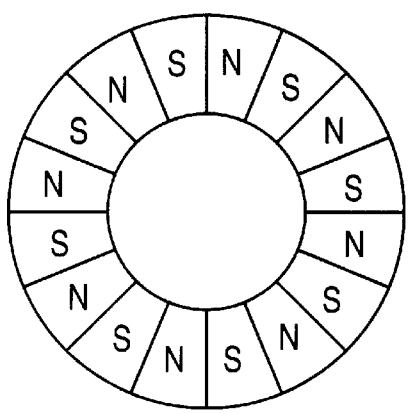
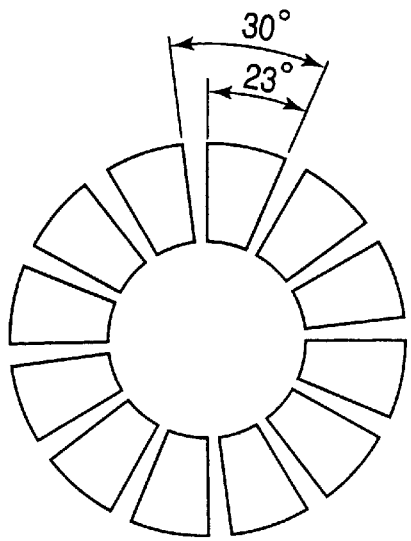
*Fig. 6(a)* PRIOR ART    *Fig. 6(b)* PRIOR ART

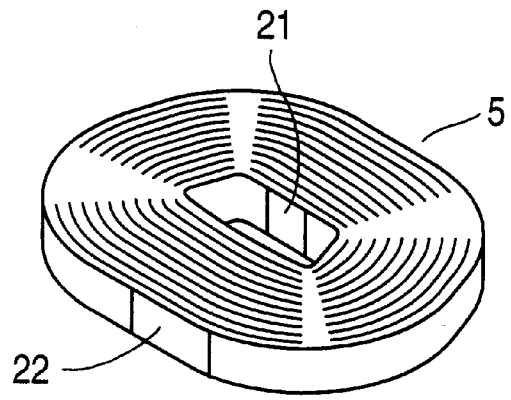
Fig. 9
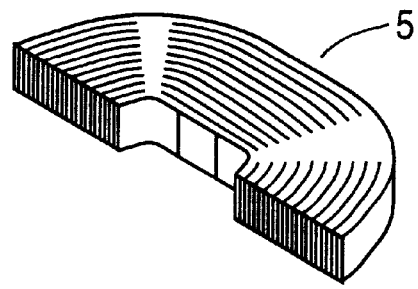
Fig. 10
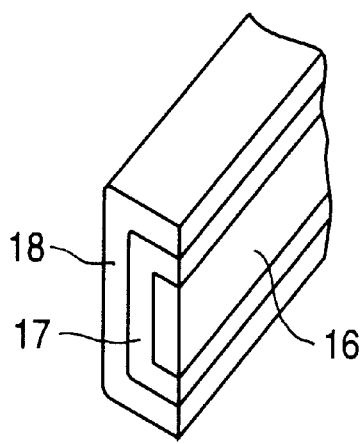 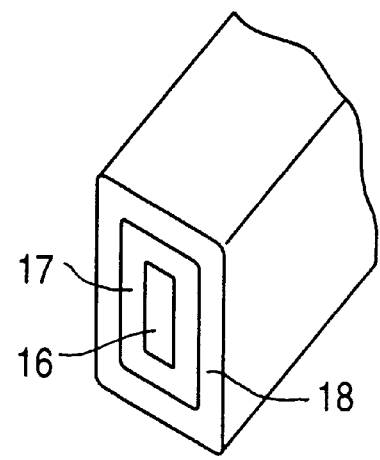
Fig. 11    Fig. 12

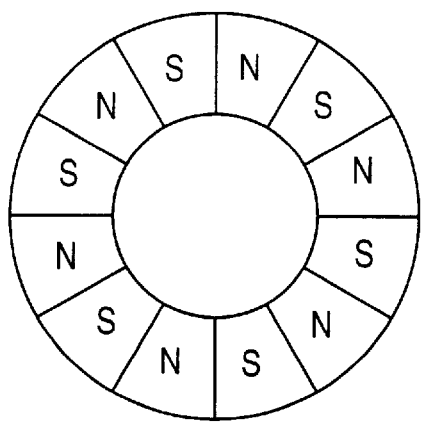
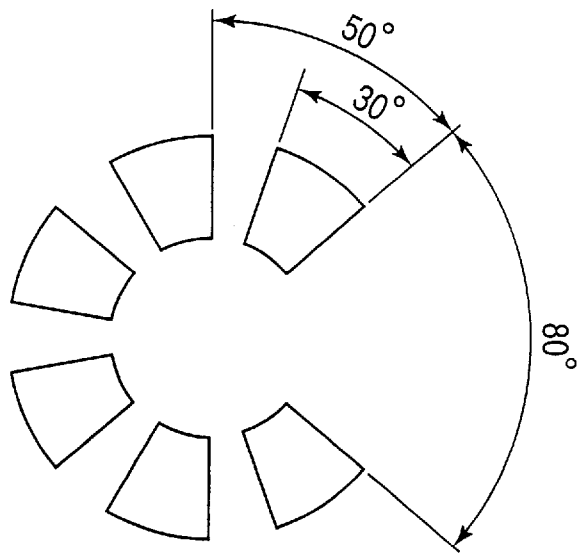
*Fig. 13(a)*      *Fig. 13(b)*
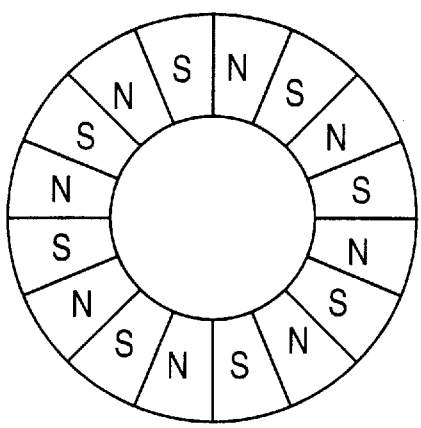
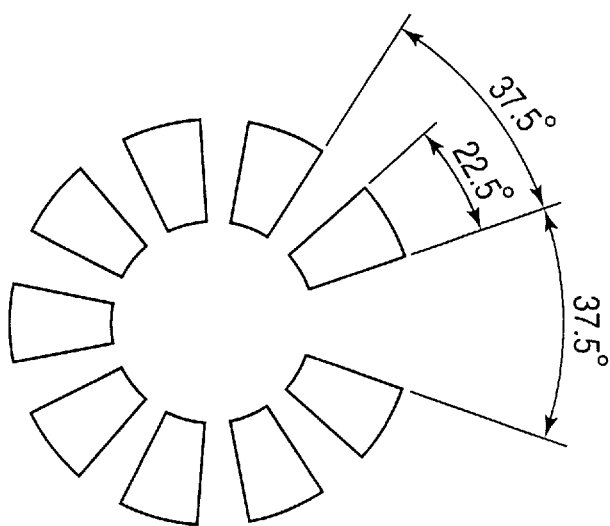
*Fig. 14(a)*      *Fig. 14(b)*

MAGNETIC DISC DRIVING APPARATUS

BACKGROUND OF THE INVENTION

1. Field of the Invention

The present invention relates to a magnetic disc driving apparatus such as a driving device for a removable flexible disc, particularly, relates to a driving magnets and an allocation of coils in a spindle motor.

2. Description of the Related Art

Recently, a floppy disc drive (FDD) is required of a smaller and thinner profile, and further required of high performance. Accordingly, a spindle motor utilized for an FDD is required of a smaller and thinner profile and also high performance.

FIG. 3 is a perspective view of a 3-phase flat spindle motor for an FDD of ½ inch thick. The motor comprises the stator 103 composed of the metal-based printed circuit board 112 and the rotor 101, which is attached to the stator 103 with rotating freely.

FIG. 2 is a sectional view of the main part of the motor. Further, FIG. 1 is a plan view of the spindle motor shown in FIG. 3 with removing the rotor 101 and a bearing (not shown). In the case of a 3-phase driving motor, the relation between a quantity of magnetic poles and a quantity of coils is shown in Table 1 if quantities of the magnetic poles and the coils are 4 n and 3 n respectively, where "n" is an integer of more than one. A magnetization chart of the driving magnet and the allocation chart of coils are shown in FIGS. 4(a) through 6(b), in case that the "n" is from 2 to 4. FIGS. 4(a), 5(a) and 6(a) respectively show the magnetization of the driving magnet. FIGS. 4(b), 5(b) and 6(b) respectively show the allocation of the coils. FIG. 1 shows the example of 16 poles and 12 coils.

TABLE 1

| n | 1 | 2 | 3 | 4 | ... |
|---|---|---|---|---|-----|
| Quantity of magnetic poles (4n) | 4 | 8 | 12 | 16 | ... |
| Quantity of coils (3n) | 3 | 6 | 9 | 12 | ... |

The stator 103 is composed of the metal-based printed circuit board 112. There provided a plurality of flat coils 105 and 107 on the metal-based printed circuit board 112 in a ring. Each coil is annulately allocated by the electrical angle of $(4/3)\pi$ and is adjacent to each other. These flat coils 105 and 107 are formed a fan shape of a narrower inner circumference and a wider outer circumference. Electric current flows through the coils and the coils function as driving coils for the rotor 101. The flat coils 105 and 107 are different from each other in a plain size. Each flat coil 107 of a smaller plain size is allocated between every 3 flat coils 105 of a larger plain size.

According to FIG. 1, 12 flat coils in total composing of 9 flat coils 105 of the larger plain size and 3 flat coils 107 of the smaller plain size are allocated with covering 360 degrees. A frequency generator (FG) pattern 104 is provided in adjacent to the outer circumference of the flat coils 105 and 107. 3 magnetic sensors or Hall elements 106 for detecting position are respectively provided in between the flat coil 107 of the smaller plain size and the FG pattern 104.

The plain size of the flat coil 107 is smaller than that of the flat coil 105 by design in order to secure the space for arranging the Hall element 106, which is utilized for detecting a magnetic pole position of the rotor 101, on the metal-based printed circuit board 112 inside the FG pattern 104. The flat coil 107 of the smaller plain size is allocated at equal intervals of 120 degrees to other 2 flat coils 107 respectively. A magnetic recording and reproducing head (magnetic head) 108 is allocated at the area facing toward the flat coil 107 of the smaller plain size.

A driving ring magnet 102 is provided on the rotor 101 with facing toward the flat coils 105 and 107 on the stator 103. An FG magnet 109 is provided on the rotor 101 with facing toward the FG pattern 104. An FG signal for controlling rotation is generated by the FG pattern 104 provided on the stator 103 and the FG magnet 109 provided at the outermost circumference of the rotor 101.

The driving ring magnet 102 is magnetized in 16 poles radially. A spindle 114 is fixed at the center of the rotor 101 and the spindle 114 is secured in the bearing (not shown) provided on the stator 103 so as to rotate freely.

According to the configuration mentioned above, since the Hall elements 106 are allocated in an adjacent area of the FG pattern 104 in order to detect a magnetic pole position of the rotor 101, a space must be provided inside the FG pattern 104 so as to lead out wiring from the Hall element 106 to the outside of the FG pattern 104. The FG pattern 104 is lacked to almost ⅔ of the total circumference in order to provide connecting patterns for the flat coils 105 and the Hall elements 106. As a result of lacking the FG pattern 104, an output of the FG signal decreases and an accurate signal can not be obtained. Accordingly, it causes some problems such that rotation accuracy of the rotor 101 is deteriorated.

Further, since it is necessary to manufacture the flat coil 107 of the smaller plain size in addition to the flat coil 105 of the larger plain size or a regular size, it causes another problem of increasing a cost of the stator 103 in order to manufacture at least 2 types of flat coils and to assemble them.

Furthermore, since the flat coil 107 of the smaller size is utilized, flux from a magnetic circuit can not be utilized sufficiently. It causes further subjects to be solved such that a torque and a torque coefficient, hereinafter called a Kt, are reduced. Moreover, since the magnetic head 108, which records signals on or reproduces signals from a magnetic disc, approaches the upper side of the flat coil 107 of the smaller plain size closely, the magnetic head 108 happens to detect noise from the flat coil 107 by way of the rotor 101 and it may cause a data error.

In addition thereto, in case that the driving ring magnet 102 of 16 poles or 8 pair poles is utilized, each magnetic pole pitch 110 is 360°÷16=22.5°. In case that 12 flat coils are allocated, a coil allocation pitch 111 becomes 360°÷12=30°. It is hard to secure sufficient coil width because neighboring flat coils come in contact with each other. On the other hand, in case that neighboring flat coils generate magnetic field of different poles respectively, a part of fluxes directly cancels each other and generated torque is deteriorated, since utilization efficiency of fluxes is decreased. By arranging the neighboring flat coils so as to generate magnetic field of the same polarity, fluxes generated by a driving coil are effectively interacted with a driving magnetic pole and torque performance is improved. Particularly, it is necessary for the neighboring flat coils to generate magnetic field of the same polarity in order to obtain necessary torque performance even though a thickness of a rotor and a stator is thinned. However, on the other hand, fluxes generated by the driving coil leak out from the rotor. The leaked fluxes may affect the magnetic head and interfere with reading and writing data. Further, the larger outer diameter of a motor, the more torque is generated, and the better motor efficiency is obtained because a total amount of fluxes of driving magnetic poles and winding of a driving coil are increased. Thus, it is effective to extend the outer diameter of the rotor as far as a vicinity of a moving area of the magnetic head. However, in this case, fluxes leaked out from the rotor as mentioned above seriously affect the magnetic head. Particularly, in case that a device is arranged in a thin profile, reading and writing data are interfered by leaked fluxes because a distance of a thrust direction between the magnetic head and the driving coil is shortened. Accordingly, it is necessary to enlarge the distance of the thrust direction between the magnetic head and the driving coil in order to solve the problem. Enlarging the distance is also another problem for thinning a thickness of a device

SUMMARY OF THE INVENTION

Accordingly, in consideration of the above-mentioned problems of the prior art, an object of the present invention is to provide a magnetic disc driving apparatus such as a driving device for a removable flexible disc.

In order to achieve the above object, the present invention provides, according to an aspect thereof, a magnetic disc driving apparatus, which comprises an FG (Frequency Generator) pattern being annulately formed on a substrate constituting a stator with surrounding a spindle, 3 m flat coils being allocated in a circumference in a pitch of $(5/3)\pi$ of the electrical angle each other, where m is an integer of more than 2 and a driving ring magnet having 4 n magnetic poles, which is allocated on a rotor with facing toward the flat coils, where n is an integer of more than 3, the magnetic disc driving apparatus further characterized by that a magnetic sensor is allocated in a maximum spacing area provided in between the 3 m flat coils allocated in a circumference.

According to another aspect of the present invention, there provided a magnetic disc driving apparatus, which comprises a printed circuit board, a spindle retained on the printed circuit board so as to rotate freely, a driving ring magnet having 4 n driving magnetic poles in the circumference direction, where n is an integer of more than 3, wherein the driving ring magnet is fixed to the spindle, a rotor of driving a magnetic disc to rotate in conjunction with rotation of the ring driving magnet, a magnetic head provided within a predetermined moving area with approaching the magnetic disc, a driving coil of 3-phase Y connection or Y network composed of 3 m flat coils, where m is an integer of more than 2, facing toward the driving magnetic pole, which is annulately allocated in a doughnut shaped area having an inner radius of R1 and an outer radius of R2 in coaxial with a center axis of rotation of the spindle, and driving circuit means for switching over the driving coil and for making driving current flow through the driving coil so as to generate revolving magnetic field, the magnetic disc driving apparatus makes the rotor generate revolving driving force by an interaction between the revolving magnetic field and the driving magnetic pole, and the magnetic disc driving apparatus is further characterized by that the flat coils are allocated so as to generate magnetic field of a same polarity for neighboring flat coils under a condition of flowing driving current through arbitrary 2 phases out of 3 phases, and by that the flat coils are allocated by such a manner that radial axes of the flat coils are directed to out side of a maximum spacing area ranging from 10 degrees to 60 degrees in a direction of the moving area of the magnetic head.

Other object and further features of the present invention will be apparent from the following detailed description when read in conjunction with the accompanying drawings.

BRIEF DESCRIPTION OF DRAWINGS

FIG. 3 is a perspective view of a spindle motor for an FDD (Floppy Disc Drive) according to the prior art.

FIG. 4(a) shows magnetization of an 8-pole ring magnet according to the prior art.

FIG. 4(b) shows a coil allocation of 6 coils according to the prior art.

FIG. 5(a) shows magnetization of a 12-pole ring magnet according to the prior art.

FIG. 5(b) shows a coil allocation of 9 coils according to the prior art.

FIG. 6(a) shows magnetization of a 16-pole ring magnet according to the prior art.

FIG. 6(b) shows a coil allocation of 12 coils according to the prior art.

FIG. 9 is a perspective view of a coil of a flat rectangular wire according to the embodiment of the present invention.

FIG. 10 is a sectional view of the coil shown in FIG. 9.

FIG. 11 is a perspective sectional view of the flat rectangular wire, which is insulated on one side, according to the embodiment of the present invention.

FIG. 12 is a perspective sectional view of the flat rectangular wire, which is insulated on both sides, according to the embodiment of the present invention.

FIG. 13(a) shows magnetization of a 12-pole ring magnet according to a variation of the embodiment of the present invention.

FIG. 13(b) shows a coil allocation of 6 coils according to a variation of the embodiment of the present invention.

FIG. 14(a) shows magnetization of a 16-pole ring magnet according to the embodiment of the present invention.

FIG. 14(b) shows a coil allocation of 9 coils according to the embodiment of the present invention.

DETAILED DESCRIPTION OF THE PREFERRED EMBODIMENTS

[Embodiment]

Figure 16:
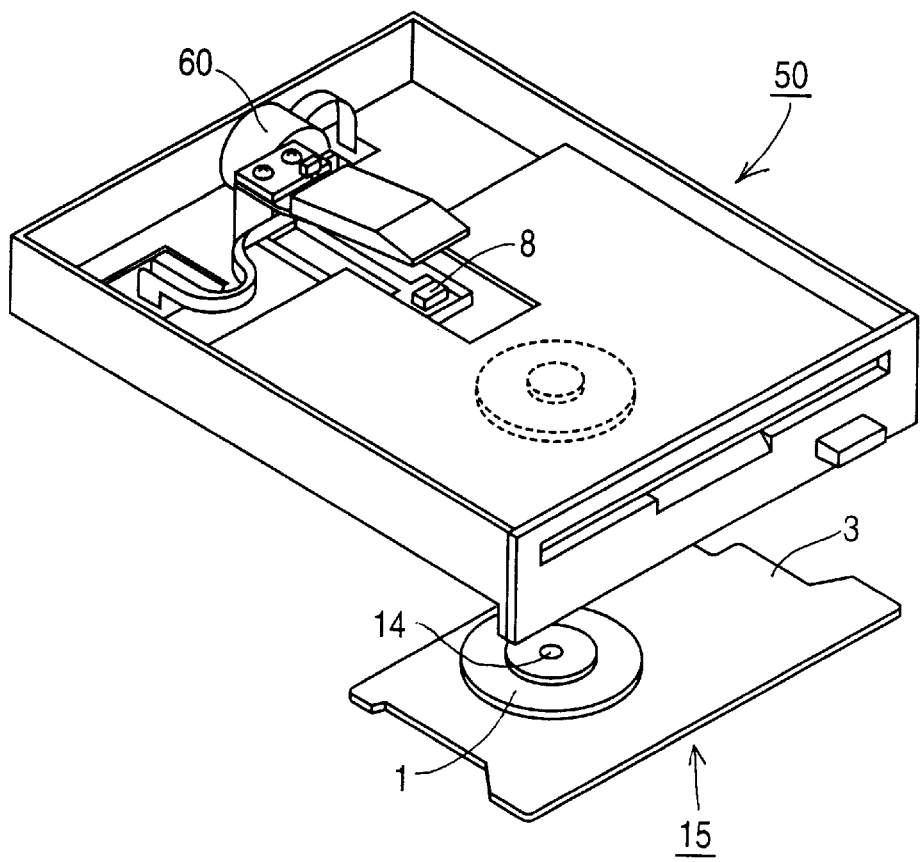
FIG. 16 shows a FDD device comprising a spindle motor and a magnetic head according to the embodiment of the present invention.

FIG. 16 is an internal construction of an FDD (Floppy Disc Drive) device 50 showing a relative position of a spindle motor 15 and a magnetic head 8. In FIG. 16, the magnetic head 8 records signals on a magnetic disc (not shown) or reproduces signals recorded on a magnetic disc (not shown) while the magnetic head 8 moves linearly toward a spindle 14 of the spindle motor 15 with being driven by a stepping motor 60. The spindle motor 15 comprises a rotor 1, a stator 3 and the spindle 14.

Figure 8:
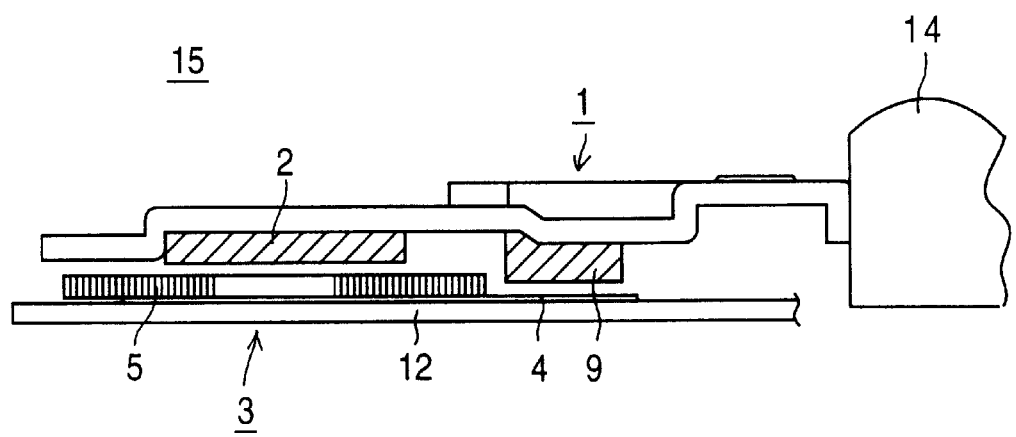
FIG. 8 is a sectional view of the main part of the spindle motor according to the embodiment of the present invention.

FIG. 8 is a sectional view of the main part of the spindle motor 15 according to an embodiment of the present invention. In FIG. 8, the spindle motor 15 comprises a rotor 1, a stator 3 and a spindle 14. The rotor 1 is composed of a driving ring magnet 2 and an FG (Frequency Generator) magnet 9. The driving ring magnet 2 provided on the rotor 1 with facing toward the flat coil 5 is magnetized radially in 16 poles as shown in FIG. 14(a). Each pole of the driving ring magnet 2 is allocated in a pitch of 360°÷16=22.5°. The FG magnet 9 is magnetized in 96 poles, that is, 48 poles in pair. Therefore, a pitch of one magnetic pole is 360°÷96= 3.75° in the mechanical angle. On the rotor 1, the driving ring magnet 2 is allocated in a position facing toward the flat coil 5 and the FG magnet 9 is allocated in another position facing toward the FG pattern 4 respectively. The stator 3 is composed of an FG pattern 4 and a flat coil 5, which are stacked on a metal-based printed circuit board 12. The driving ring magnet 2 provided on the rotor 1 with facing toward the flat coil 5 is magnetized radially in 16 poles as shown in FIG. 14(a).

Figure 1:
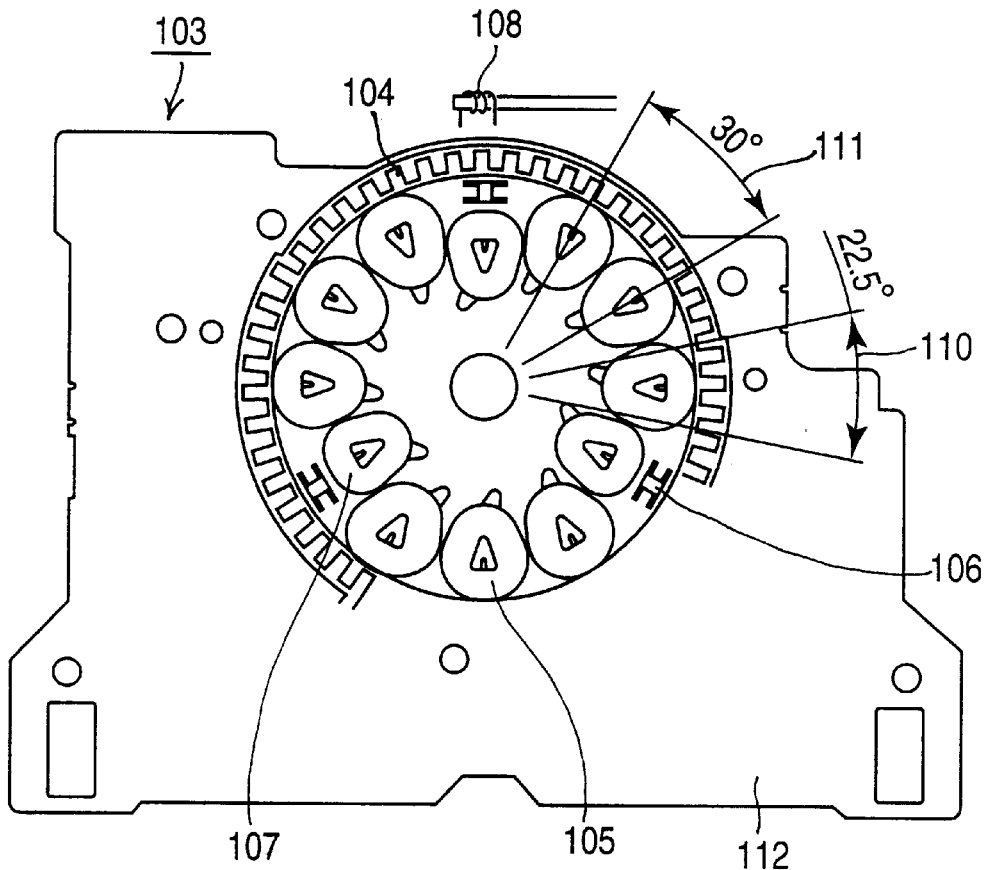
FIG. 1 shows a FG (Frequency Generator) pattern and an allocation of coils according to the prior art.
Figure 2:
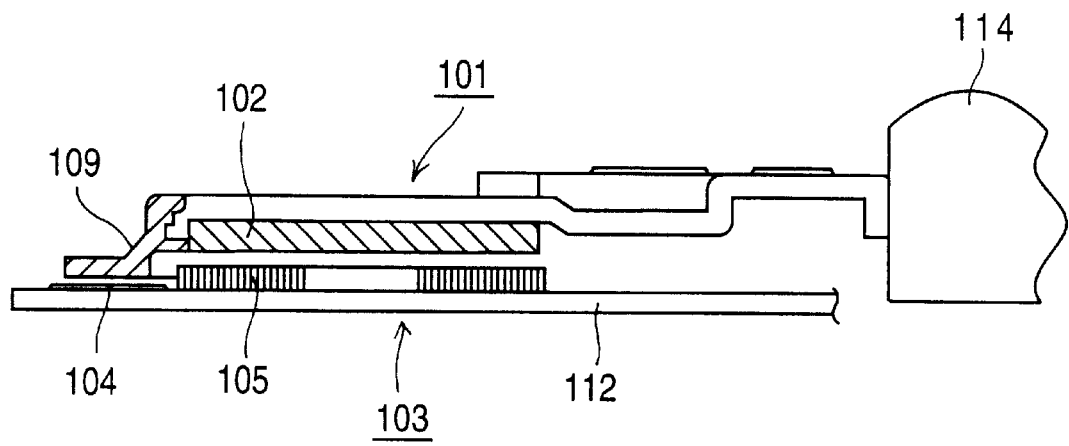
FIG. 2 is a sectional view of the main part of the spindle motor according to the prior art.
Figure 7:
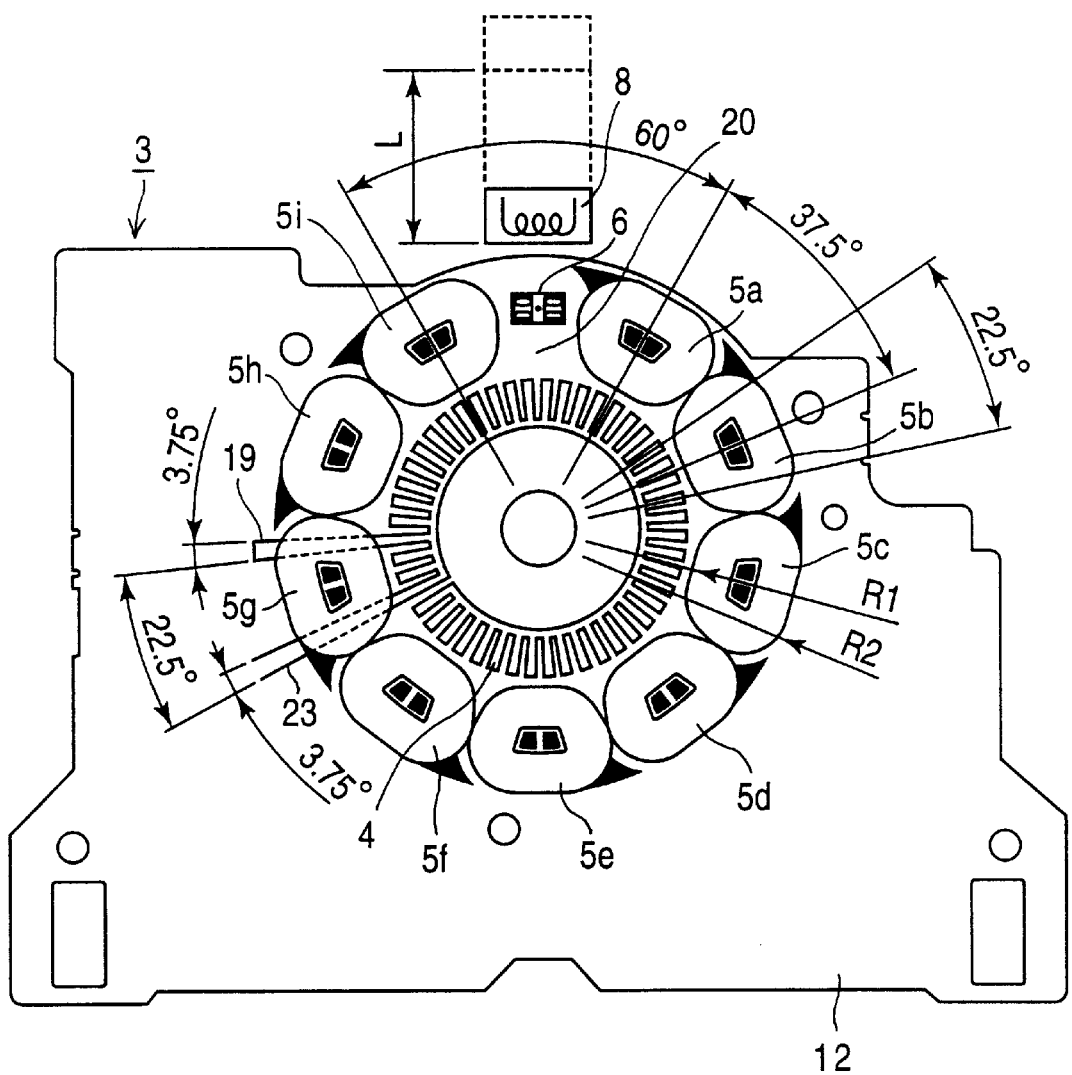
FIG. 7 is a plan view of a stator showing an FG (Frequency Generator) pattern and an allocation of coils according to an embodiment of the present invention.

FIG. 7 is a plan view of the stator 3 with removing the rotor 1 and the spindle 14 from the spindle motor 15. According to the embodiment of the present invention, a rotation driving system of the spindle motor 15 is a driving system composed of 3 phases, 16 poles, 9 flat coils and one magnetic sensor. The stator 3 comprises the FG pattern 4, 9 flat coils 5a through 5i, a Hall element 6 and an area 20 for a magnetic sensor, and they are allocated on the metal-based printed circuit board 12.

In FIG. 7, the stator 3 is composed of the metal-based printed circuit board 12 of an iron system as a stator yoke. The FG pattern 4 for 48-pulse FG is formed in an inner circumference area of the stator 3 and is provided with a canceling pattern 19 and a pair of lead wire 23 of the FG pattern 4. An angle of the lead wire 23 is arranged to be 3.75° in accordance with the mechanical angle of one magnetic pole of the FG magnet 9 as mentioned above. Further, the canceling pattern 19 is allocated in a pitch of 22.5° being apart from the lead wire 23 and extended to an outside area of the outer circumference of flat coils. Furthermore, the lead wire 23 and the canceling pattern 19 are affected by a same amount of fluxes from the driving ring magnet 2. However, directions of fluxes affecting the lead wire 23 and the canceling pattern 19 are opposite to each other because they are allocated to the same pitch as that of each magnetic pole of the driving ring magnet 2. Therefore, affection of the driving ring magnet 2 to the lead wire 23 and the canceling pattern 19 is canceled. Accordingly, an FG signal outputted from the lead wire 23 is not affected by leakage fluxes of the driving ring magnet 2. 9 flat coils, the first flat coil 5a through the ninth flat coil 5i, are allocated in adjacent to each other with surrounding the FG pattern 4. They are annulately allocated in a doughnut shaped area having an inner radius of R1 and an outer radius of R2. The reference number 5 hereinafter represents all the flat coils for easier explanation except specifying a flat coil such as the first flat coil 5a or the ninth flat coil 5i. Each flat coil 5 is formed in a fan shape such as a smaller inner circumference in comparison with an outer circumference as shown in FIG. 14(b) and its width is 22.5°. Neighboring flat coils 5 are allocated in 37.5° adjacent to each other. However, one spacing area is provided in between the first flat coil 5a and the ninth flat coil 5i for allocating a Hall element 6 as an area 20 for a magnetic sensor. A moving area of the magnetic head 8, which is indicated as a moving distance "L" in FIG. 7, is allocated in an area facing toward the area 20 for a magnetic sensor.

In addition thereto, a flat rectangular wire, which is a rectangular shape in cross section, is utilized for the flat coil 5. FIGS. 9 through 12 depict details of the flat coil 5. FIG. 9 is a perspective view of the flat coil 5. In FIG. 9, the flat coil 5 comprises an electrode 21 of start of winding and another electrode 22 of end of winding. FIG. 10 is a sectional view of the flat coil 5 shown in FIG. 9. FIG. 12 shows a sectional configuration of a flat rectangular wire. A copper wire 16 is a rectangular shape in cross section and coated with an insulation layer 17 and an adhesive layer 18. FIG. 11 is a sectional view of a flat rectangular wire with being insulated on one side of the copper wire 16. The copper wire 16 is coated with an insulation layer 17 and an adhesive layer 18 on one side of the copper wire 16. A flat coil formed by such a flat rectangular wire insulated on one side can produce a motor of high efficiency, since a dimension of the flat coil can be reduced totally.

The neighboring 2 flat coils 5 are allocated in a pitch of $(5/3)\pi$ of the electrical angle and in a pitch of $(360°÷16)\times(5/3)=37.5°$ of the mechanical angle as mentioned above However, a pitch between the first flat coil 5a and the ninth flat coil 5i is $(8/3)\pi$ of the electrical angle and 60° of the mechanical angle since the area 20 for a magnetic sensor is provided in between them for the Hall element 6. In addition thereto, a spacing area of 22.5° of the mechanical angle is presented in between the first flat coil 5a and the ninth flat coil 5i.

Figure 15A:
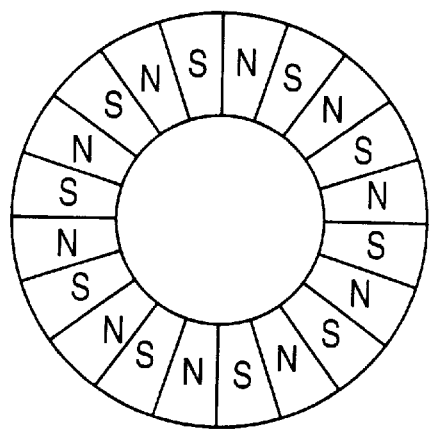
FIG. 15(a) shows magnetization of a 20-pole ring magnet according to another variation of the embodiment of the present invention.
Figure 15B:
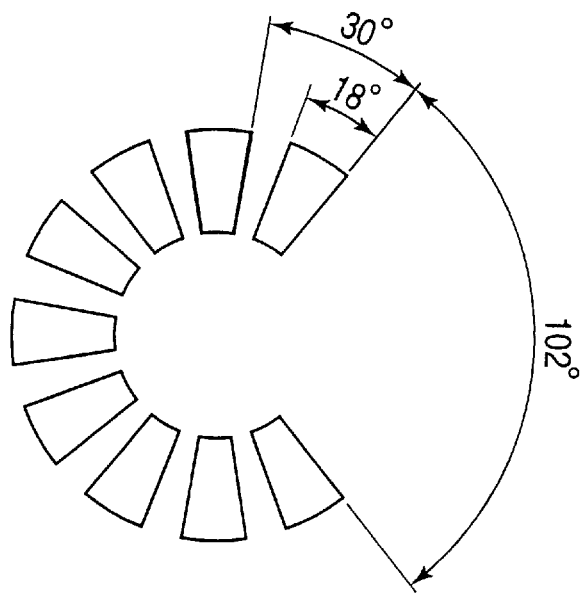
FIG. 15(b) shows a coil allocation of 9 coils according to another variation of the embodiment of the present invention.

Thus, in the case of a regular 3-phase driving motor, a quantity of magnetic poles is 4 n and a quantity of coils is 3 n, where "n" is an integer of more than one. According to the embodiment of the present invention, a quantity of magnetic poles is 4 n such as 16 poles and a quantity of coils is 3 m such as 9 coils, where "n" is an integer of more than 3 and "m" is an integer of more than 2. The magnetization of the 16 magnetic poles and the allocation of 9 coils are shown in FIGS. 14(a) and 14(b) respectively. In addition thereto, a case of 12 magnetic poles and 6 coils are shown in FIGS. 13(a) and 13(b), and another case of 20 magnetic poles and 9 coils are shown in FIGS. 15(a) and 15(b) respectively as variations.

According to the aspect of the present invention, a spindle motor is provided with one spacing area among a plurality of flat coils annulately allocated in a doughnut shaped area. Since a magnetic sensor is allocated in the spacing area, it is not necessary to allocate a small flat coil in diameter so that a number of flat coils can be decreased and manpower and a manufacturing cost for assembling a spindle motor can be reduced. Further, since the spacing area among the flat coils is allocated in a moving area of a magnetic head, the magnetic head is hardly affected by leaked fluxes from the flat coils. Accordingly an incidence of data error is reduced in a FDD device. Furthermore, a starting torque and a torque constant (Kt) are improved because a flat coil can be allocated in an outer circumference area and a dimension of the flat coil can sufficiently be enlarged. Moreover, since an FG pattern can be formed inside an inner circumference area of flat coils, the FG pattern is not obstructed by lead wires of a magnetic sensor and can be formed all along the circumference inside the inner circumference of the flat coils or driving coils so that a rotation accuracy of the motor is improved.

While the invention has been described above with reference to specific embodiment thereof, it is apparent that many changes, modifications and variations in the arrangement of equipment and devices can be made without departing from the invention concept disclosed herein. For example, a non-sensor driving motor, which is not provided with a magnetic sensor, can also solve the problems described in the prior art.

What is claimed is:

1. A magnetic disc driving apparatus comprising:

an FG (Frequency Generator) pattern being annulately formed on a substrate constituting a stator with surrounding a spindle;

3 m flat coils being allocated in a circumference in a pitch of $(5/3)\pi$ of the electrical angle each other, where m is an integer of more than 2; and a driving ring magnet having 4 n magnetic poles, which is allocated on a rotor with facing toward said flat coils, where n is an integer of more than 3, said magnetic disc driving apparatus further characterized by that a magnetic sensor is allocated in a maximum spacing area provided in between said 3 m flat coils allocated in a circumference.

2. The magnetic disc driving apparatus in accordance with claim 1, wherein said maximum spacing area is allocated in an area coinciding with a moving area of a magnetic head.

3. The magnetic disc driving apparatus in accordance with claim 1, wherein said flat coils are made by a flat rectangular wire.

4. A magnetic disc driving apparatus comprising:

a printed circuit board;

a spindle retained on said printed circuit board so as to rotate freely;

a driving ring magnet having 4 n driving magnetic poles in the circumference direction, where n is an integer of more than 3, wherein said driving ring magnet is fixed to said spindle;

a rotor of driving a magnetic disc to rotate in conjunction with rotation of said driving ring magnet;

a magnetic head provided within a predetermined moving area with approaching said magnetic disc;

a driving coil of 3-phase Y connection or Y network composed of 3 m flat coils, where m is an integer of more than 2, facing toward said driving magnetic pole, which is annulately allocated in a doughnut shaped area having an inner radius of R1 and an outer radius of R2 in coaxial with a center axis of rotation of said spindle; and driving circuit means for switching over said driving coil and for making driving current flow through said driving coil so as to generate revolving magnetic field, said magnetic disc driving apparatus makes said rotor generate revolving driving force by an interaction between said revolving magnetic field and said driving magnetic pole, and said magnetic disc driving apparatus is further characterized by that said flat coils are allocated so as to generate magnetic field of a same polarity for neighboring flat coils under a condition of flowing driving current through arbitrary 2 phases out of 3 phases, and by that said flat coils are allocated by such a manner that radial axes of said flat coils are directed to out side of a maximum spacing area ranging from 10 degrees to 60 degrees in a direction of the moving area of said magnetic head.

5. The magnetic disc driving apparatus in accordance with claim 4, wherein a magnetic sensor is allocated in the maximum spacing area.

6. The magnetic disc driving apparatus in accordance with claim 4, wherein an FG pattern is provided in the inner circumference area of said driving coil.

7. The magnetic disc driving apparatus in accordance with claim 4, wherein said driving coil is made by a flat rectangular wire.

* * * * *